United States Patent
Han et al.

(10) Patent No.: US 11,503,974 B2
(45) Date of Patent: Nov. 22, 2022

(54) CLEANER AND METHOD OF CONTROLLING THE SAME

(71) Applicant: LG ELECTRONICS INC., Seoul (KR)

(72) Inventors: Jinwoo Han, Seoul (KR); Hyunwoong Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 228 days.

(21) Appl. No.: 16/496,035

(22) PCT Filed: Mar. 7, 2018

(86) PCT No.: PCT/KR2018/002694
§ 371 (c)(1),
(2) Date: Sep. 20, 2019

(87) PCT Pub. No.: WO2018/174435
PCT Pub. Date: Sep. 27, 2018

(65) Prior Publication Data
US 2020/0022552 A1   Jan. 23, 2020

(30) Foreign Application Priority Data
Mar. 23, 2017  (KR) .................. 10-2017-0037063

(51) Int. Cl.
*A47L 11/40*  (2006.01)
*B60L 53/35*  (2019.01)
(Continued)

(52) U.S. Cl.
CPC ......... *A47L 11/4011* (2013.01); *A47L 9/2852* (2013.01); *A47L 9/2873* (2013.01);
(Continued)

(58) Field of Classification Search
CPC .. A47L 11/4011; A47L 9/2852; A47L 9/2873; A47L 9/2894; A47L 2201/022;
(Continued)

(56) References Cited

U.S. PATENT DOCUMENTS 7,729,803 B2 * 6/2010 Lim .................... G05D 1/0225
                                                          700/218
8,606,401 B2 * 12/2013 Ozick .................... A47L 9/12
                                                          700/258
(Continued)

FOREIGN PATENT DOCUMENTS

| CN | 1923469 | 3/2007 |
|---|---|---|
| CN | 103948354 | 7/2014 |

(Continued)

OTHER PUBLICATIONS

Chinese Office Action (with English translation) dated Oct. 26, 2020 issued in CN Application No. 201880029120.0.
(Continued)

*Primary Examiner* — Bhavesh V Amin
(74) *Attorney, Agent, or Firm* — Ked & Associates, LLP

(57) ABSTRACT

A cleaner performing autonomous traveling includes a main body, a driving unit moving the main body, a battery supplying power to the driving unit, a communication unit performing communication with a charging station to charge the battery, a sensor sensing a signal emitted from the charging station, and a controller controlling the driving unit such that the main body is docked to the charging station on the basis of the signal sensed by the sensor, wherein when the main body starts to move to dock to the charging station, the controller determines a kind of the signal sensed by the sensor and controls the driving unit such that the main body moves along a traveling path corresponding to a circle
(Continued)

centered on a predetermined point on the basis of the determined kind of the signal.

19 Claims, 9 Drawing Sheets

(51) Int. Cl.
*A47L 9/28* (2006.01)
*G05D 1/00* (2006.01)
*G05D 1/02* (2020.01)

(52) U.S. Cl.
CPC ............ *A47L 9/2894* (2013.01); *B60L 53/35* (2019.02); *G05D 1/0088* (2013.01); *G05D 1/0214* (2013.01); *G05D 1/0225* (2013.01); *A47L 2201/022* (2013.01); *A47L 2201/04* (2013.01); *G05D 2201/0203* (2013.01)

(58) Field of Classification Search
CPC .. A47L 2201/04; A47L 9/2889; A47L 9/2826; B60L 53/35; G05D 1/0088; G05D 1/0214; G05D 1/0225; G05D 2201/0203; G05D 2201/0215; Y02T 90/12; Y02T 10/7072; Y02T 10/70
See application file for complete search history.

(56) References Cited

U.S. PATENT DOCUMENTS

| | | | |
|---|---|---|---|
| 8,655,539 B2* | 2/2014 | Yoo | G05D 1/0272 700/258 |
| 8,954,192 B2* | 2/2015 | Ozick | A47L 9/0488 700/258 |
| 9,229,454 B1* | 1/2016 | Chiappetta | A47L 9/2894 |
| 9,751,214 B2* | 9/2017 | Kim | B60L 53/60 |
| 9,923,389 B2* | 3/2018 | Kwon | H02J 50/12 |
| 9,989,968 B2* | 6/2018 | Shen | G05D 1/0242 |
| 2005/0156562 A1* | 7/2005 | Cohen | G05D 1/0242 320/107 |
| 2007/0050086 A1* | 3/2007 | Lim | G05D 1/0242 700/245 |
| 2008/0065266 A1* | 3/2008 | Kim | G05D 1/0242 901/1 |
| 2008/0091304 A1* | 4/2008 | Ozick | A47L 11/24 700/258 |
| 2011/0004339 A1* | 1/2011 | Ozick | A47L 9/2852 700/245 |
| 2011/0118928 A1* | 5/2011 | Yoo | A47L 9/2805 701/25 |
| 2014/0288709 A1 | 9/2014 | Sim et al. | |
| 2015/0289740 A1* | 10/2015 | Yan | G05D 1/0225 701/2 |
| 2015/0375395 A1* | 12/2015 | Kwon | A47L 9/2873 901/30 |
| 2016/0229060 A1* | 8/2016 | Kim | B25J 9/1694 |
| 2017/0147001 A1* | 5/2017 | Shen | G05D 1/0242 |

FOREIGN PATENT DOCUMENTS

| | | |
|---|---|---|
| CN | 105242674 | 1/2016 |
| DE | 20 2009 018 986 | 3/2015 |
| EP | 1 760 564 | 3/2007 |
| EP | 2 325 714 | 5/2011 |
| EP | 2 781 981 | 9/2014 |
| EP | 3 054 361 | 8/2016 |
| JP | 2009-238055 | 10/2009 |
| JP | 2013-141341 | 7/2013 |
| KR | 10-2004-0087176 | 10/2004 |
| KR | 10-2009-0088587 | 8/2009 |
| KR | 10-2009-0111170 | 10/2009 |
| KR | 10-2012-0055891 | 6/2012 |
| KR | 10-1395888 | 5/2014 |

OTHER PUBLICATIONS

Korean Office Action dated May 31, 2021 issued in KR Application No. 10-2017-0037063.
International Search Report dated Jun. 21, 2018 issued in Application No. PCT/KR2018/002694.
Written Opinion dated Jun. 21, 2018 issued in Application No. PCT/KR2018/002694.
European Search Report dated Nov. 27, 2020 issued in EP Application No. 18770646.0.

* cited by examiner

CLEANER AND METHOD OF CONTROLLING THE SAME

BACKGROUND OF THE INVENTION

1. Field of the Invention

The present disclosure relates to a cleaner and a control method thereof, and particularly, to a cleaner which recognizes an obstacle and performs autonomous traveling, and a control method thereof.

2. Background of the Invention

In general, a robot has been developed for an industrial purpose and has been in charge of part of factory automation. Recently, robot-applied fields have further extended to develop medical robots or aerospace robots, and home robots that may be used in general houses have also been made.

A typical example of home robots is a robot cleaner, which is a sort of a home appliance for performing cleaning by sucking ambient dust or foreign objects, while traveling in a predetermined area. Such a robot cleaner includes a generally rechargeable battery and has an obstacle sensor capable of avoiding an obstacle during traveling so that the robot cleaner may perform cleaning, while traveling.

Recently, beyond performing cleaning while robot cleaners are simply autonomously traveling in a cleaning area, research into utilization of robot cleaners in various fields such as healthcare, smart home, remote control, and the like, has been actively conducted.

When the robot cleaner performs autonomous traveling in a cleaning area, a capacity of a battery may be drop to below a limit capacity, while the robot cleaner is performing a cleaning function. Thus, in order for the robot cleaner to smoothly perform autonomous traveling, when the capacity of the battery drops to below a predetermined capacity, the robot cleaner may move to a charging station installed within the cleaning area to charge the battery.

Meanwhile, when the cleaner attempts at docking to charge the battery, a battery charge terminal provided in the cleaner body and a power supply terminal provided in the charging station are to be positioned to correspond to each other. Thus, in order for the battery to be smoothly provided with power, an angle at which the cleaner enters the charging station should fall within an appropriate angle range.

In this connection, Korean Patent Laid-Open Publication No. 10-2009-0111170 (Publication date: Oct. 26, 2009) discloses a configuration in which a distance signal for measuring a distance for accurate docking is transmitted, a guidance signal is received, or a traveling direction is varied.

However, such a configuration cannot solve a problem that a time required for the cleaner to dock to the charging station is unnecessarily increased.

SUMMARY OF THE INVENTION

Therefore, an aspect of the detailed description is to provide a robot cleaner which is guided to a position where a charging station is installed and docked to the charging station, a charging station, a robot cleaner system having the same, and a control method thereof.

Another aspect of the detailed description is to provide a robot cleaner capable of reducing a time required for docking to a charging station, a charging station, a robot cleaner system having the same, and a control method thereof.

Another aspect of the detailed description is to provide a robot cleaner capable of controlling a docking posture when the robot cleaner approaches a charging station so that a battery may be smoothly charged, a charging station, a robot cleaner system having the same, and a control method thereof.

Another aspect of the detailed description is to provide a robot cleaner capable of accurately recognizing a location of the robot cleaner using an overlap region among a plurality of signal regions.

To achieve these and other advantages and in accordance with the purpose of this specification, as embodied and broadly described herein, a cleaner performing autonomous traveling includes: a main body; a driving unit moving the main body; a battery supplying power to the driving unit; a communication unit performing communication with a charging station to charge the battery; and a controller controlling the driving unit such that the main body is docked to the charging station on the basis of a signal received by the communication unit from the charging station.

In an embodiment, when the main body starts to move to dock to the charging station, if a distance from the main body to the charging station is shorter than a reference distance, the controller may control the driving unit such that the main body moves along a circle centered on a predetermined center.

In an embodiment, before the main body moves along the circle, the controller may rotate the main body such that one side of the main body faces the charging station.

In an embodiment, a point as the center of the circle is a point spaced apart from the one side of the main body by a predetermined distance when the one side of the main body faces the charging station.

In an embodiment, the controller may control the driving unit such that the one side of the main body faces the charging station, while the main body is moving along the circle.

In an embodiment, when the communication unit receives different signals from the charging station while the main body is moving along the circle, the controller may control the driving unit such that the main body moves straight.

In an embodiment, when the communication unit receives at least three kinds of signals from the charging station, the controller may control the driving unit such that the main body moves straight.

In an embodiment, the controller may determine a distance from the main body to the charging station using a signal received by the communication unit from the charging station.

In an embodiment, the controller may set a radius of the circle on the basis of characteristics of a signal emitted from the charging station.

In an embodiment, when the main body starts to move to dock to the charging station, if a distance from the main body to the charging station is equal to or greater than the reference distance, the controller may move the main body to a position where the charging station is installed.

In an embodiment, when the main body enters to a point at which a distance from the main body to the charging station is smaller than the reference distance, the controller may control the driving unit such that the main body moves along a circle centered on a predetermined point.

In an embodiment, the cleaner may further include: a sensor unit sensing information related to an obstacle present near the main body, and the controller may determine whether an obstacle is present on the traveling path using information sensed by the sensor unit, while the main body is moving along the traveling path corresponding to the circle.

In an embodiment, when it is determined that an obstacle is present on the traveling path, the controller may control the driving unit such that the main body is maintained at a predetermined distance from the obstacle.

In an embodiment, the controller may detect a distance between the center of the circle and the main body, while the obstacle present on the traveling path is avoided.

In an embodiment, when it is determined that an obstacle is present on the traveling path, the controller may control the driving unit such that the main body is maintained at the predetermined distance from the obstacle and the distance between the center of the circle and the main body is shorter than the radius of the circle.

In an embodiment, after avoidance traveling with respect to the obstacle present on the traveling path is performed, when the distance between the center of the circle and the main body corresponds to the radius of the circle, the controller may control the driving unit such that the main body moves along the traveling path corresponding to the circle.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
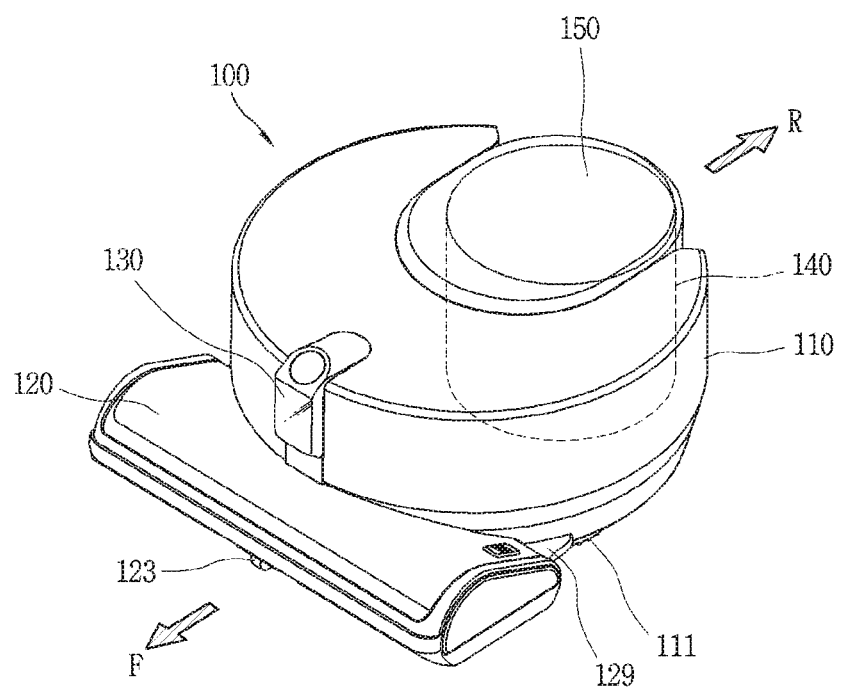
FIG. 1 is a perspective view illustrating an example of a cleaner performing autonomous traveling according to an embodiment of the present disclosure.
Figure 2:
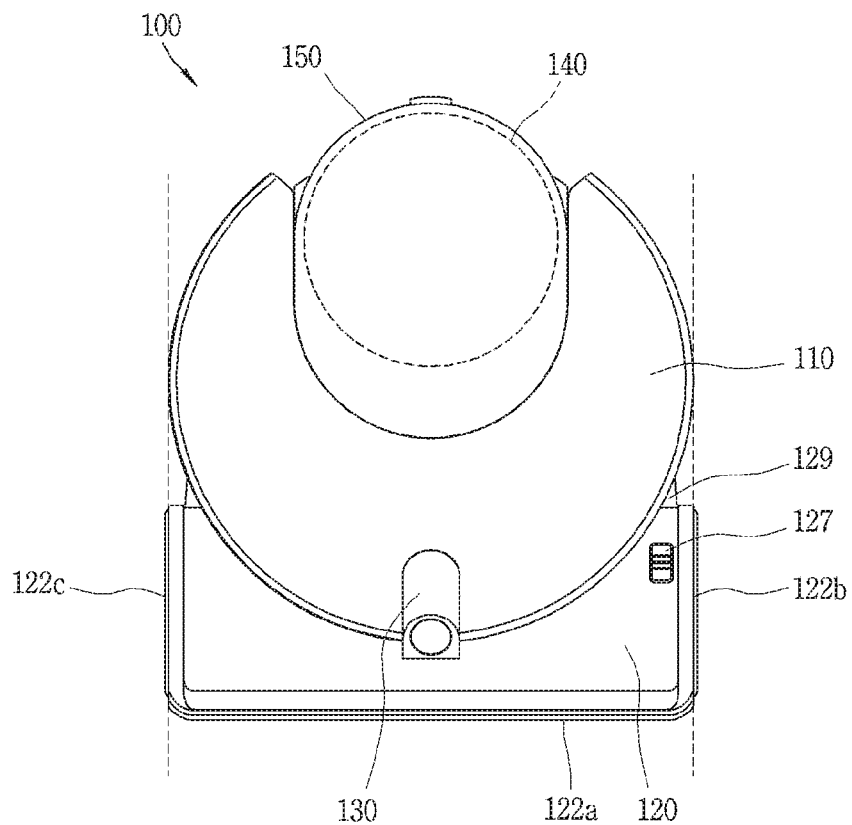
FIG. 2 is a plan view of the cleaner illustrated in FIG. 1.
Figure 3:
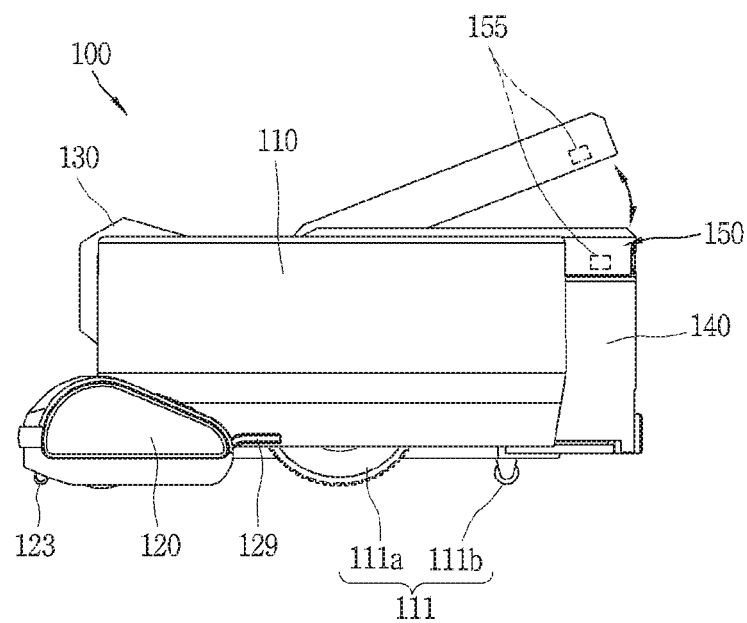
FIG. 3 is a side view of the cleaner illustrated in FIG. 1.

FIG. 1 is a perspective view illustrating an example of a robot cleaner 100 according to the present disclosure, FIG. 2 is a plan view of the robot cleaner 100 illustrated in FIG. 1, and FIG. 3 is a side view of the robot cleaner 100 illustrated in FIG. 1.

For reference, in this disclosure, a moving robot, a robot cleaner, and a cleaner performing autonomous traveling may be used to have the same meaning.

Referring to FIGS. 1 to 3, the robot cleaner 100 performs a function of cleaning a floor, while traveling a predetermined area by itself. Here, cleaning the floor includes sucking dust (including a foreign object) of the floor and wiping the floor.

The robot cleaner 100 includes a cleaner body (or main body) 110, a suction unit 120, a sensing unit 130, and a dust box 140.

A controller (not shown) for controlling the robot cleaner 100 and a wheel unit 111 for causing the robot cleaner 100 to travel are provided in the cleaner body 110. The robot cleaner 100 may be moved or rotated in every direction by the wheel unit 111.

The wheel unit 111 includes a main wheel 111a and a sub-wheel 111b.

The main wheel 111a is provided on both sides of the cleaner body 110 and is rotatable in one direction or in the other direction according to a control signal from the controller. Each main wheel 111a may be configured to be driven mutually independently. For example, each main wheel 111a may be driven by different motors.

The sub-wheel 111b supports the cleaner body 110 with the main wheel 111a and assists traveling of the robot cleaner 100 by the main wheel 111a. The sub-wheel 111b may also be provided in the suction unit 120 described hereinafter.

As described above, as the controller controls driving of the wheel unit 111, the robot cleaner 100 may autonomously travel on the floor.

Meanwhile, a battery (not shown) supplying power to the robot cleaner 100 is installed in the cleaner body 110. The battery may be rechargeable and may be detachably provided on a bottom surface part of the cleaner body 110.

The suction unit 120 is disposed to protrude from one side of the cleaner body 110 and suck air including dust. The one side may be a side in which the cleaner body 110 travels in a forward direction (F), i.e., a front side of the cleaner body 110.

In the drawing, it is illustrated that the suction unit 120 protrudes from one side of the cleaner body 110 to the front side and to the left and right sides. In detail, a front end portion of the suction unit 120 is disposed in a position spaced apart from one side of the cleaner body 110 forwardly, and left and right end portions of the suction unit 120 are disposed in positions spaced apart from one side of the cleaner body 110 leftwardly and rightwardly.

As the cleaner body 110 has a circular shape and both sides of a rear end portion of the suction unit 120 protrude to both left and right sides of the cleaner body 110, an empty space, i.e., a gap, may be formed between the cleaner body 110 and the suction unit 120. The empty space may be a space between left and right end portions of the cleaner body 110 and left and right end portions of the suction unit 120, and has a shape recessed to an inner side of the robot cleaner 100.

In case where an obstacle is caught in the empty space, the robot cleaner 100 may be caught by the obstacle and cannot move. In order to prevent this, the cover member 129 may be disposed to cover at least a portion of the empty space. The cover member 129 may be provided in the cleaner body 110 or the suction unit 120. In this embodiment, the cover member 129 protrudes from both sides of a rear end portion of the suction unit 120 and covers an outer circumferential surface of the cleaner body 110.

The cover member 129 is disposed to fill the empty space, i.e., at least a portion of the empty space between the cleaner body 110 and the suction unit 120. Thus, an obstacle is prevented from being caught in the empty space, or although an obstacle is caught in the empty space, the robot cleaner may be easily released from the obstacle.

The cover member 129 protruding from the suction unit 120 may be supported by an outer circumferential surface of the cleaner body 110. When the cover member 129 protrudes from the cleaner body 110, the cover member 129 may be supported by a rear surface portion of the suction unit 120. According to the structure, when the suction unit 120 collides with an obstacle, a partial amount of the impact may be transmitted to the cleaner body 110 such that the impact is distributed.

The suction unit 120 may be detachably coupled to the cleaner body 110. When the suction unit 120 is separated from the cleaner body 110, a cloth module (not shown) may be detachably coupled to the cleaner body 110. Thus, when the user wants to remove dust from a floor, the user may attach the suction unit 120 to the cleaner body 110, and when the user wants to wipe the floor, the user may attach the cloth module to the cleaner body 110.

When the suction unit 120 is mounted in the cleaner body 110, mounting of the suction unit 120 may be guided by the aforementioned cover member 129. That is, since the cover member 129 is disposed to cover an outer circumferential surface of the cleaner body 110, a relative position of the suction unit 120 with respect to the cleaner body 110 may be determined.

The sensing unit 130 is disposed in the cleaner body 110. As illustrated, the sensing unit 130 may be disposed on one side of the cleaner body 110 where the suction unit 120 is positioned, i.e., on the front side of the cleaner body 110.

The sensing unit 130 may be disposed to overlap the suction unit 120 in a vertical direction of the cleaner body 110. The sensing unit 130 may be disposed above the suction unit 120 to sense an obstacle, a geographic feature, and the like, in front of the robot cleaner 100 such that the suction unit 120 positioned on the forefront may not collide with the obstacle.

The sensing unit 130 is configured to additionally perform another sensing function in addition to such sensing (or detection) function. This will be described in detail hereinafter.

A dust box accommodation part is provided in the cleaner body 110, and a dust box 140 separately collecting dust in sucked air is detachably coupled to the dust box accommodation part. As illustrated, the dust box accommodation part may be provided on the other side of the cleaner body 110, i.e., on the rear of the cleaner body 110.

A portion of the dust box 140 may be accommodated in the dust box accommodation part while another portion of the dust box 140 may protrude toward a rear side (i.e., in a reverse direction (R) opposite to a forward direction (F)) of the cleaner body 110.

An inlet, to which air including dust is introduced, and an outlet, from which air separated from dust is discharged, are provided in the dust box 140. When the dust box 140 is installed in the dust box accommodation part, the inlet and the outlet communicate with a first opening and a second opening provided on an inner side wall of the dust box accommodation part.

An intake flow channel within the cleaner body 110 corresponds to a flow channel from an inlet (not shown) communicating with a communication part to the first opening, and an exhaust flow channel corresponds to a flow channel from the second opening to an exhaust.

According to the connection relationship, air including dust introduced through the suction unit 120 is introduced to the dust box 140 through the intake flow channel within the cleaner body 110 and air and dust are separated from each other through a filter or cyclone of the dust box 140. Dust is collected by the dust box 140 and air is discharged from the dust box 140, passes through an exhaust flow channel within the cleaner body 110, and is finally discharged to the outside through the exhaust.

Hereinafter, an embodiment related to components of the robot cleaner 100 will be described with reference to FIG. 4.

The robot cleaner 100 or the moving robot according to an embodiment of the present disclosure may include at least one of a communication unit (or communication interface) 1100, an input unit 1200, a driving unit (or motor) 1300, a sensing unit 1400, an output unit 1500, a power supply unit 1600, a memory 1700, and a controller 1800, and any combination thereof.

Figure 4:
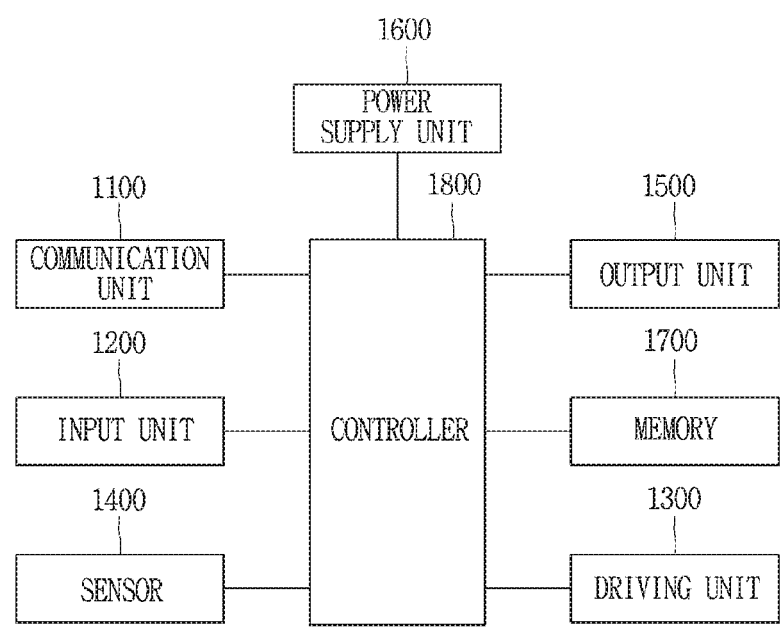
FIG. 4 is a block diagram illustrating components of a cleaner according to an embodiment of the present disclosure.

Here, the components illustrated in FIG. 4 are not essential and a robot cleaner including greater or fewer components may be implemented. Hereinafter, the components will be described.

First, the power supply unit 1600 includes a battery that may be charged by external commercial power and supplies power to the inside of the moving robot. The power supply unit 1600 may supply driving power to each of the components included in the moving robot to provide operation power required for the moving robot to travel (or move or run) or perform a specific function.

Here, the controller 1800 may detect a remaining capacity of power of the battery, and when the remaining capacity of power is insufficient, the controller 1800 controls the moving robot to move to a charging station connected to an external commercial power so that the battery may be charged upon receiving a charge current from the charging station. The battery may be connected to a battery sensing unit and a remaining battery capacity and a charging state thereof may be transmitted to the controller 1800. The output unit 1500 may display a remaining battery capacity on a screen by the controller 1800.

The battery may be positioned on a lower side of the center of the robot cleaner or may be positioned on one of left and right sides. In the latter case, the moving robot may further include a balance weight (or a counter weight) in order to resolve weight unbalance of the battery.

Meanwhile, the driving unit 1300 may include a motor and drive the motor to rotate left and right main wheels of the main body of the moving robot in both directions to rotate or move the main body. The driving unit 1300 may move the main body of the moving robot forwards/backwards and leftwards/rightwards, or enable the main body of the moving robot to travel in a curved manner or rotate in place.

Meanwhile, the input unit 1200 receives various control commands regarding the robot cleaner from a user. The input unit 1200 may include one or more buttons, for example, an OK button, a setting button, and the like. The OK button is a button for receiving a command for checking detection information, obstacle information, position information, and map information from the user, and the setting button may be a button for receiving a command for setting the aforementioned types of information from the user.

Also, the input unit 1200 may include an input resetting button for canceling a previous user input and receiving a user input again, a delete button for deleting a preset user input, a button for setting or changing an operation mode, or a button for receiving a command for returning to the charging station.

Also, the input unit 1200 may be installed in an upper portion of the moving robot, as a hard key, a soft key, or a touch pad. Also, the input unit 1200 may have a form of a touch screen together with the output unit 1500.

Meanwhile, the output unit 1500 may be installed in an upper portion of the moving robot. An installation position or an installation form thereof may be varied. For example, the output unit 1500 may display a battery state or a traveling scheme.

Also, the output unit 1500 may output information regarding a state of an interior of the moving robot detected by the sensing unit 1400, for example, a current state of each component included in the moving robot. Also, the output unit 1500 may display external state information, obstacle information, position information, and map information detected by the sensing unit 1400 on a screen. The output unit 1500 may be configured as at least one device among a light emitting diode (LED), a liquid crystal display (LCD), a plasma display panel (PDP), an organic light emitting diode (OLED).

The output unit 1500 may further include a sound output unit audibly outputting an operational process or an operation result of the moving robot performed by the controller 1800. For example, the output unit 1500 may output a warning sound outwardly according to a warning signal generated by the controller 1800.

Here, the sound output unit may be a unit for outputting a sound, such as a beeper, a speaker, and the like, and the output unit 1500 may output audio data or message data having a predetermined pattern stored in the memory 1700 through the sound output unit.

Thus, the moving robot according to an embodiment of the present disclosure may output environment information regarding a traveling region on a screen or output it as a sound through the output unit 1500. Also, according to another embodiment, the moving robot may transmit map information or environment information to a terminal device through the communication unit 1100 such that the terminal device may output a screen or a sound to be output through the output unit 1500.

Meanwhile, the communication unit 1100 may be connected to the terminal device and/or a different device positioned within a specific region (which will be used together with a "home appliance" in this disclosure) according to one communication scheme among wired, wireless, and satellite communication schemes to transmit and receive data.

The communication unit 1100 may transmit and receive data to and from a different device positioned within a specific region. Here, the different device may be any device as long as it may be connected to a network and transmit and receive data. For example, the different device may be a device such as an air-conditioner, a heating device, an air purifier, a lamp, a TV, an automobile, and the like. Also, the different device may be a device for controlling a door, a window, a plumbing valve, a gas valve, and the like. Also, the different device may be a sensor sensing a temperature, humidity, atmospheric pressure, a gas, and the like.

Meanwhile, the memory 1700 stores a control program controlling or driving the robot cleaner and data corresponding thereto. The memory 1700 may store audio information, image information, obstacle information, position information, map information, and the like. Also, the memory 1700 may store information related to a traveling pattern.

As the memory 1700, a non-volatile memory is commonly used. Here, the non-volatile memory (NVM) (or NVRAM) is a storage device capable of continuously maintaining stored information even though power is not applied thereto. For example, the memory 1700 may be a ROM, a flash memory, a magnetic computer storage device (for example, a hard disk or a magnetic tape), an optical disk drive, a magnetic RAM, a PRAM, and the like.

Meanwhile, the sensing unit 1400 may include at least one of an external signal sensor, a front sensor, a cliff sensor, a lower camera sensor, and an upper camera sensor.

The external signal sensor may sense an external signal of the moving robot. The external signal sensor may be, for example, an infrared sensor, an ultrasonic sensor, an RF sensor, and the like.

The moving robot may check a position and a direction of the charging station upon receiving a guide signal generated by the charging station using the external signal sensor. Here, the charging station may transmit the guide signal indicating a direction and a distance such that the moving robot may be returned. That is, upon receiving the signal transmitted from the charging station, the moving robot may determine a current position and set a movement direction to return to the charging station.

Meanwhile, the front sensor may be installed at a predetermined interval on a front side of the moving robot, specifically, along an outer circumferential surface of a side surface of the moving robot. The front sensor may be positioned on at least one side surface of the moving robot to sense an obstacle ahead. The front sensor may sense an object, in particular, an obstacle, present in a movement direction of the moving robot and transfer detection information to the controller 1800. That is, the front sensor may sense a protrusion present in a movement path of the moving robot, furnishings, furniture, a wall surface, a wall corner, and the like, in a house, and transmit corresponding information to the controller 180.

The front sensor may be, for example, an infrared sensor, an ultrasonic sensor, an RF sensor, a geomagnetic sensor, and the like, and the moving robot may use one kind of sensor or two or more kinds of sensors together as the front sensor.

For example, in general, the ultrasonic sensor may be mainly used to sense an obstacle in a remote area. The ultrasonic sensor may include a transmission unit and a reception unit. The controller 1800 may determine whether an obstacle is present according to whether an ultrasonic wave radiated through the transmission unit is reflected by an obstacle, or the like, and received by the reception unit, and calculate a distance to the obstacle by using an ultrasonic wave radiation time and an ultrasonic wave reception time.

Also, the controller 1800 may detect information related to a size of an obstacle by comparing an ultrasonic wave radiated from the transmission unit and an ultrasonic wave received by the reception unit. For example, as a larger amount of ultrasonic waves is received by the reception unit, the controller 1800 may determine that the size of the obstacle is larger.

In an embodiment, a plurality of ultrasonic sensors (for example, five ultrasonic sensors) may be installed on an outer circumferential surface of a front side of the moving robot. Here, preferably, the transmission units and the reception units of the ultrasonic sensors may be installed alternately on the front side of the moving robot.

Namely, the transmission units may be disposed to be spaced apart from the center of the front side of the main body of the moving robot, and in this case, one or two or more transmission units may be disposed between reception units to form a reception region of an ultrasonic signal reflected from the obstacle, or the like. Due to this disposition, a reception region may be expanded, while reducing the number of sensors. A transmission angle of ultrasonic waves may be maintained at an angle of a range which does not affect other signals to prevent a crosstalk phenomenon. Also, reception sensitivity of the reception units may be set to be different.

Also, the ultrasonic sensors may be installed upwardly at a predetermined angle such that ultrasonic waves generated by the ultrasonic sensors are output upwardly, and in this case, in order to prevent the ultrasonic waves from being radiated downwardly, a predetermined blocking member may be further provided.

Meanwhile, as mentioned above, two or more kinds of sensors may be used as the front sensors, and thus, any one kind of sensors among an infrared sensor, an ultrasonic sensor, and an RF sensor may be used as the front sensors.

For example, the front sensor may include an infrared sensor as another kind of sensor, in addition to the ultrasonic sensor.

The infrared sensor may be installed on an outer circumferential surface of the moving robot together with the ultrasonic sensor. The infrared sensor may also sense an obstacle present in front of or by the side of the moving robot and transmit corresponding obstacle information to the controller 1800. That is, the infrared sensor may sense a protrusion present in a movement path of the moving robot, furnishings, furniture, a wall surface, a wall corner, and the like, in a house, and transmit corresponding information to the controller 1800. Thus, the moving robot may move within a cleaning area without colliding with an obstacle.

Meanwhile, as the cliff sensor, various types of optical sensors may be used, and the cliff sensor may sense an obstacle on the floor supporting the main body of the moving robot.

That is, the cliff sensor may be installed on a rear surface of the moving robot 100 and may be installed in different regions depending on a kind of a moving robot. The cliff sensor may be positioned on a rear surface of the moving robot to sense an obstacle on the floor. The cliff sensor may be an infrared sensor including a light emitting unit and a light receiving unit, an ultrasonic sensor, an RF signal, a position sensitive detector (PSD) sensor, and the like, like the obstacle sensor.

For example, any one of cliff sensors may be installed on the front side of the moving robot, and the other two cliff sensors may be installed on a relatively rear side.

For example, the cliff sensor may be a PSD sensor or may include a plurality of different kinds of sensor.

The PSD sensor detects the positions of the short and long distances of an incident light with a single p-n junction by using the surface resistance of a semiconductor. The PSD sensor includes a 1D PSD sensor that detects light on a single axis and a 2D PSD sensor that may detect the position of light on the surface, and they have a pin photodiode structure. The PSD sensor is a type of infrared sensor which transmits an infrared ray to an obstacle and measures an angle between the infrared ray transmitted to the obstacle an infrared ray returned after being reflected from the obstacle, thus measuring a distance therebetween. That is, the PSD sensor calculates a distance to the obstacle using triangulation.

The PSD sensor includes a light emitting unit emitting infrared light to an obstacle and a light receiving unit receiving infrared light returned after being reflected from the obstacle. In general, the PSD sensor is formed as a module. In case where an obstacle is sensed by using the PSD sensor, a stable measurement value may be obtained regardless of difference in reflectivity or color of the obstacle.

The controller 1800 may measure an angle between an infrared light emitting signal irradiated by the cliff sensor toward the floor and a reflection signal received after being reflected from the obstacle to sense a cliff, and analyze a depth thereof.

Meanwhile, the controller 1800 may determine whether the moving robot may be able to pass through a cliff according to a floor state of the cliff sensed by using the cliff sensor. For example, the controller 1800 may determine whether a cliff is present and a depth of the cliff through the cliff sensor and only when a reflection signal is sensed by the cliff sensor, the controller 1800 allows the moving robot to pass through the cliff.

In another example, the controller 1800 may determine whether the moving robot is lifted using the cliff sensor.

Meanwhile, the lower camera sensor may be provided on a rear surface of the moving robot and obtain image information related to the lower side, i.e., the floor (or a cleaning target surface) during movement.

The lower camera sensor is also called an optical flow sensor. The lower camera sensor may convert an image of the lower side input from an image sensor provided therein to generate a predetermined format of image data. The generated image data may be stored in the memory 1700.

Also, one or more light sources may be installed to be adjacent to the image sensor. One or more light sources irradiate light to a predetermined region of the floor captured by the image sensor. Namely, in case where the moving robot moves a cleaning region along the floor, when the floor is smooth, a predetermined distance is maintained between the image sensor and the floor. On the other hand, in case where the moving robot moves on the floor which is uneven, the image sensor may become away from the floor by a predetermined distance or greater due to depressions and protrusions and an obstacle of the floor. In this case, the one or more light sources may be controlled by the controller 1800 such that an amount of irradiated light may be adjusted. The light sources may be a light emitting device, for example, a light emitting diode (LED), or the like, whose amount of light may be adjusted.

The controller 1800 may detect a position of the moving robot regardless of whether the moving robot slides by using the lower camera sensor. The controller 1800 may compare and analyze image data captured by the lower camera sensor over time to calculate a movement distance and a movement direction, and calculate a position of the moving robot on the basis of the calculated movement distance and the calculated movement direction. By using the image information regarding the lower side of the moving robot using the lower camera sensor, the controller 1800 may perform correction resistant to sliding with respect to a position of the moving robot calculated by other means.

Meanwhile, the upper camera sensor may be installed to face an upper side or a front side of the moving robot to image surroundings of the moving robot. When the moving robot includes a plurality of upper camera sensors, the camera sensors may be formed on the upper portion or side surface of the moving robot at a certain distance or at a certain angle.

Figure 5:
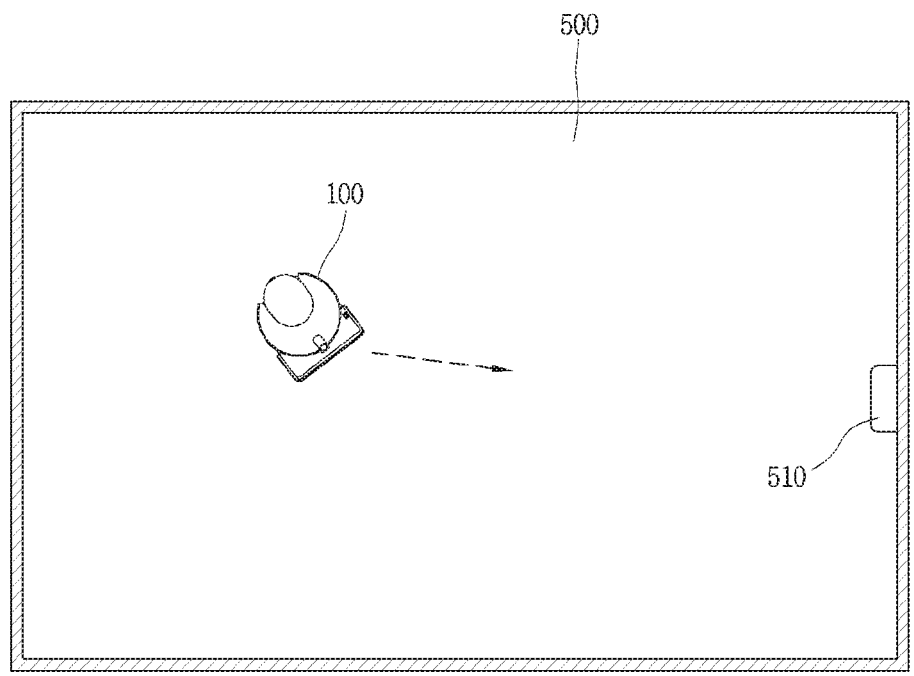
FIG. 5 is a conceptual view illustrating a cleaner and a charging station according to an embodiment of the present disclosure.

FIG. 5 illustrates an embodiment illustrating the cleaner 100 and a charging station 510 installed in the cleaning area.

As illustrated in FIG. 5, the charging station 510 for charging the battery of the cleaner 100 may be installed in the cleaning area 500. In an embodiment, the charging station 510 may be located on an outer edge the cleaning area 500.

Although not illustrated in FIG. 5, the charging station 510 includes a communication device (not shown) capable of emitting signals of different kinds, and the communication device may perform wireless communication with the communication unit 1100 of the cleaner 100.

The controller 1800 may control the driving unit 1300 to dock the main body of the cleaner 100 to the charging station 510 based on the signal received by the communication unit 1100 from the charging station 510.

When a remaining capacity of the battery drops below a limit capacity, the controller 1800 may move the main body toward the charging station 510, and when the cleaner body is close to the charging station 510, the controller 1800 may control the driving unit 1300 to start a docking function.

Figure 6A:
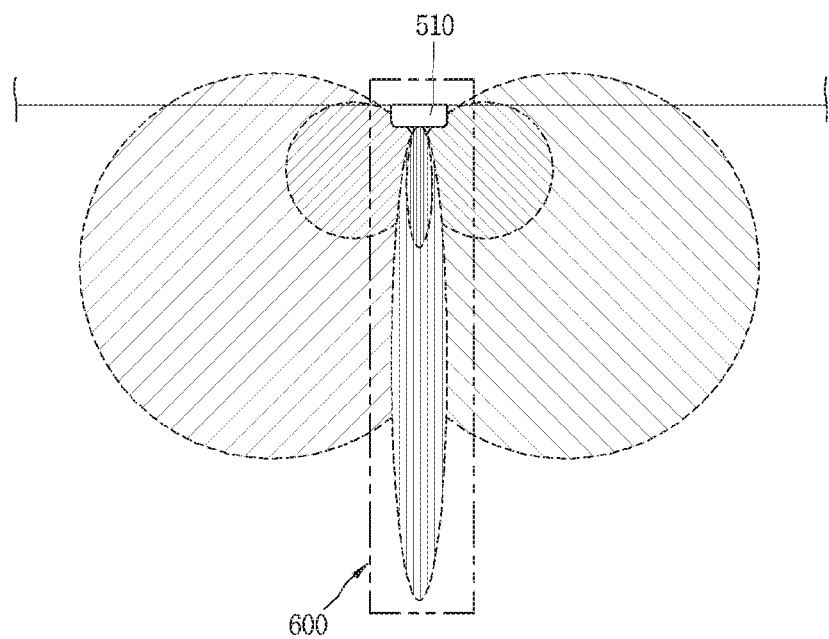
FIGS. 6A to 6D are conceptual views illustrating a signal emitted from a charging station according to an embodiment of the present disclosure.

Referring to FIG. 6A, a plurality of signals may be sent from the charging station 510. In addition, a region 600 in which a plurality of signals overlap may be formed in front of the charging station 510.

In an example, the plurality of signals transmitted from the charging station 510 may be infrared signals, and an infrared sensor (not shown) included in the sensor 1400 may sense the plurality of signals.

Hereinafter, an emission state of each of a plurality of signals will be described with reference to FIGS. 6B to 6D.

Figure 6B:
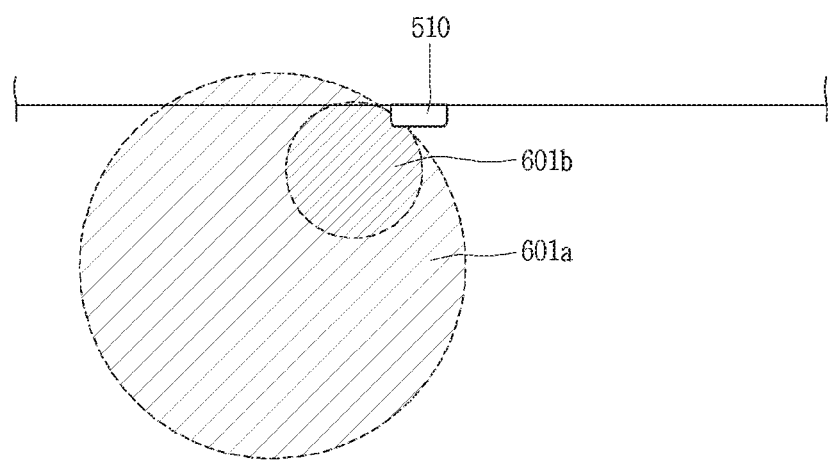

FIG. 6B illustrates an emission state of a first signal, and an entire emission region 601a and a concentrated emission region 601b of the first signal may be formed.

Specifically, the first signal may include a first short-ranged signal (or short-range signal) and a first long-ranged signal (or first long-range signal or a first remote signal). That is, the charging station 510 may emit the first short-ranged signal and the first long-ranged signal. Accordingly, a region to which both the first short-ranged signal and the first long-ranged signal are transmitted may correspond to the concentrated emission region 601b, and a region to which the first long-ranged signal is transmitted may correspond to the entire emission region 601a.

Figure 6C:
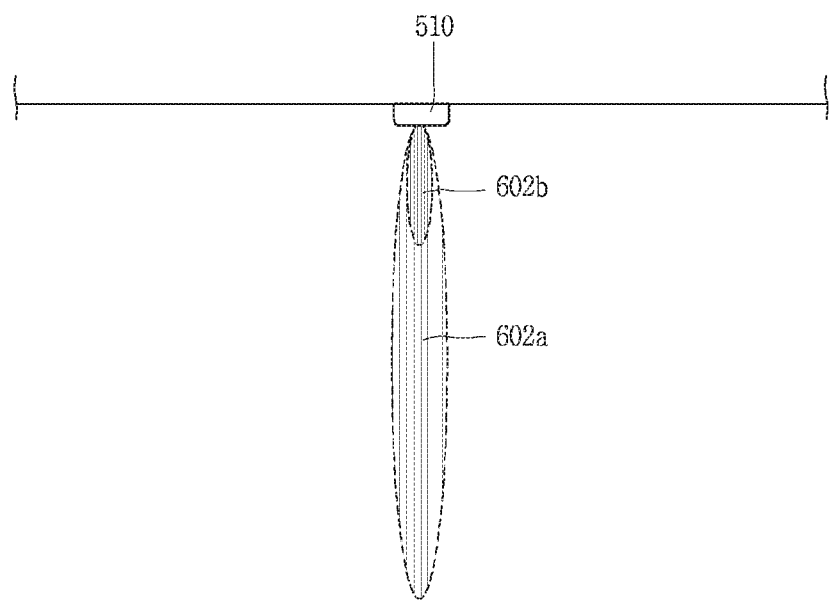
Figure 6D:
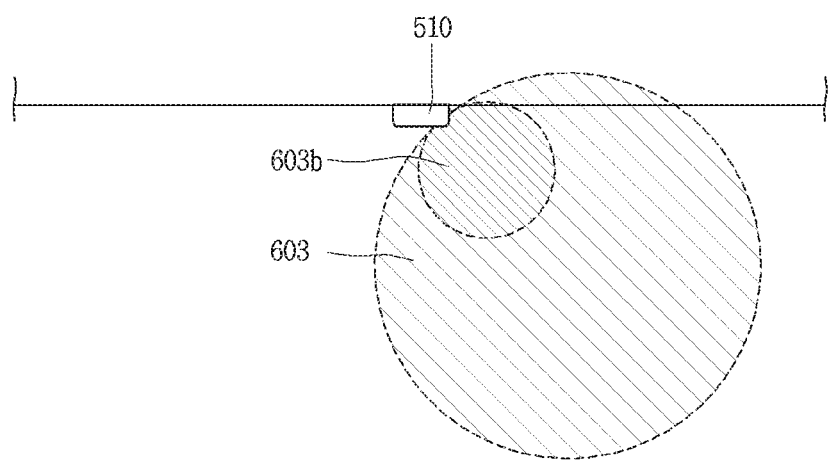

Similarly, referring to FIGS. 6C and 6D, emission states of second and third signals are shown, in which the entire emission region 602a and a concentrated emission region 602b of the second signal are formed, and the entire emission region 603a and a concentrated emission region 603b may be formed. The second signal may include a second short-ranged signal and a second long-ranged signal, and the third signal may include a third short-ranged signal and a third long-ranged signal.

The first to third signals respectively illustrated in FIGS. 6B to 6D may be all emitted according to a user selection, or only the first signal and the third signal may be emitted.

The charging station 510 may include three infrared ray generators (not shown) to emit the first to third signals, respectively. For example, the charging station 510 may include first to third infrared ray generators to emit the first to third signals in a predetermined direction.

In detail, the first infrared ray generator may emit the first signal toward the right with respect to the charging station 510, the second infrared ray generator may emit a second signal forwards from the charging station 510, and a third infrared ray generator may emit a third signal toward the left with respect to the charging station 510.

Referring to FIG. 6A, the second infrared ray generator may include a slit, and the second signal may be emitted to a narrower region by the slit than the first and third signals.

In addition, referring to FIG. 6A, a region 600 in which the first to third signals overlap may be formed. Since the region 600 in which the plurality of signals overlap is formed in front of the charging station 510, when it is determined that the main body of the cleaner 100 is located in the overlap region 600 and a front side of the main body of the cleaner 100 faces the charging station 510, the controller 1800 may dock the cleaner and the charging station by simply moving the main body straight.

Meanwhile, when the controller 1800 detects the second signal emitted to the front side of the charging station 510, the controller 1800 may determine that the main body is located in front of the charging station 510, move the main body to face the charging station 510, and move the main body straight so that the cleaner is docked to the charging station.

Hereinafter, a method of moving the main body of the cleaner 100 to the region 600 in which a plurality of signals overlap one another will be described with reference to FIGS. 7A to 7C.

When the communication unit 1100 receives a return signal from the charging station, the controller 1800 may control the driving unit 1300 to dock the main body of the cleaner 100 to the charging station 510. That is, when the communication unit 1100 receives the return signal, the controller 1800 may start movement for docking.

In an embodiment, the sensor 1400 of the cleaner 100 may sense a signal emitted from the charging station. Here, the controller 1800 may control the driving unit such that the main body is docked to the charging station based on the signal detected by the sensor.

The controller 1800 may determine a kind of the signal sensed by the sensor 1400 and control the driving unit 1300 such that the main body moves along a traveling path corresponding to a circle centered on a predetermined point on the basis of the determined kind of the signal.

For example, the controller 1800 may determine whether the kind of the signal sensed by the sensor 1400 is a short-ranged signal or a long-ranged signal. In another example, the controller 1800 may determine whether a short-ranged signal and a long-ranged signal are included in a plurality of signals sensed by the sensor 1400.

Here, the controller 1800 may determine a traveling direction of the main body based on the position where the circle is formed. That is, when the circle is formed on the right side with respect to the front side of the charging station, the controller 1800 may control the driving unit 1300 to move the main body in a counterclockwise direction with respect to the front side of the charging station. Conversely, when the circle is formed on the left side with respect to the front side of the charging station, the controller 1800 may control the driving unit 1300 to move the main body in a clockwise direction with respect to the front side of the charging station.

In addition, when movement for docking the main body to the charging station starts, if a signal sensed by the sensor 1400 includes a short-ranged signal, the controller 1800 may control the driving unit 1300 such that the main body moves along a traveling path corresponding to a circle centered on a predetermined point.

Meanwhile, if the signal sensed by the sensor 1400 includes a long-ranged signal when movement for docking the main body to the charging station starts, the controller 1800 may move the main body in a direction in which the charging station is located, in order to search for a short-ranged signal different from the long-ranged signal.

Also, when the signal sensed by the sensor 1400 includes a long-ranged signal, the controller 1800 may rotate the main body such that one side of the main body faces the charging station, before the main body moves in the direction in which the charging station is located.

The point that is the center of the circle may be a point spaced by a predetermined distance from one side of the main body in a direction toward the charging station when the one side of the main body faces the charging station.

When the sensor 1400 detects a signal emitted from a plurality of sources while the main body is moving along the traveling path corresponding to the circle, the controller 1800 may move the main body straight in a direction toward the charging station.

Specifically, when the sensor 1400 senses signals emitted from three or more sources, the controller 1800 may move the main body straight in a direction toward the charging station.

That is, when the sensor 1400 senses all infrared signals generated by the first to third infrared ray generators provided in the charging station, the controller 1800 may determine that the body of the cleaner 100 is positioned on the front side of the charging station. In addition, when the sensor 1400 senses signals emitted from three or more sources, the controller 1800 may rotate the main body such that the front side of the main body faces the charging station before the main body is to be moved straight. Here, the controller 1800 may detect whether or not the main body is located on the front side of the charging station by determining whether the plurality of signals are emitted from the plurality of sources, without determining from which sources the plurality of signals have been emitted.

The controller 1800 determines a kind of each of the plurality of signals sensed by the sensor 1400 and, when the determined kinds are equal to or greater than a predetermined number, the controller may determine that the main body of the cleaner 100 is located on the front side of the charging station.

For example, when a plurality of signals sensed by the sensor 1400 include a first short-ranged signal, a second long-ranged signal, and a third long-ranged signal, the controller 1800 may determine that the total of four kinds of signals are sensed by the sensor 1400 and accordingly determine that the main body of the cleaner 100 is located on the front side of the charging station.

Thereafter, the controller 1800 periodically determines a kind of a signal received by the sensor 1400, and at the time when the received signal is determined to include a short-ranged signal, the controller 1800 may move the main body of the cleaner 100 along a traveling path corresponding to the circle centered on a predetermined point.

In another embodiment, the controller 1800 may detect a distance between the main body of the cleaner 100 and the charging station 510. In detail, the controller 1800 may detect a distance between the main body and the charging station 510 at every predetermined interval from a point in time when it is determined that the battery needs to be charged.

When the main body of the cleaner 100 start to move to dock to the charging station 510, the controller 1800 may determine whether a distance between the charging station 510 and the main body is less than a reference distance.

Here, if the distance between the charging station 510 and the main body is less than the reference distance, the controller 1800 may control the driving unit 1300 to move the main body along a circle centered on a predetermined point.

For example, the controller 1800 may set a radius of the circle based on information related to characteristics of a signal emitted from the charging station 510. In detail, the information related to the characteristics of the signal may include information related to at least one of strength of the signal, an arrival distance of the signal, and a kind of the signal.

That is, the controller 1800 may set the radius of the circle to be shorter than a maximum distance over which the signal emitted from the charging station 510 may reach.

That is, the controller 1800 detects a distance between the charging station 510 and the main body of the cleaner to perform the docking function with respect to the charging station 510, and if the detected distance is less than the reference distance, the controller may control the driving unit 1300 to move the main body along the circular path.

Before the main body of the cleaner 100 moves along the circle, the controller 1800 may rotate the main body such that one side of the main body of the cleaner 100 faces the charging station 510. That is, before the main body moves along the circular path, the controller 1800 may rotate the cleaner 100 in place so that one side of the main body faces the charging station 510.

For example, one side of the main body may be a front surface of the main body on which a terminal (not shown) for charging the battery is provided.

Specifically, the point as the center of the circle may be a point away from one surface of the main body of the cleaner 100 by a predetermined distance toward the charging station when the one side of the main body of the cleaner 100 faces the charging station.

Also, while the main body of the cleaner 100 is moving along the circle, the controller 1800 may control the driving unit 1300 such that one side of the main body of the cleaner 100 faces the charging station.

That is, 7A, while the cleaner 100 is moving along the circle, the controller 1800 may control the driving unit 1300 such that the front side of the main body continuously faces the charging station 510.

When the communication unit 1100 of the cleaner 100 receives different signals from the charging station 510 while the main body of the cleaner 100 is moving along the circle, the controller 1800 may stop the main body on the move along the circle.

In addition, the controller 1800 may control the driving unit 1300 to move the main body in the direction toward the charging station.

In an example, when the communication unit 1100 receives three or more kinds of signals received from the charging station 510, the controller 1800 may control the driving unit 1300 such that the main body moves straight.

Figure 7A:
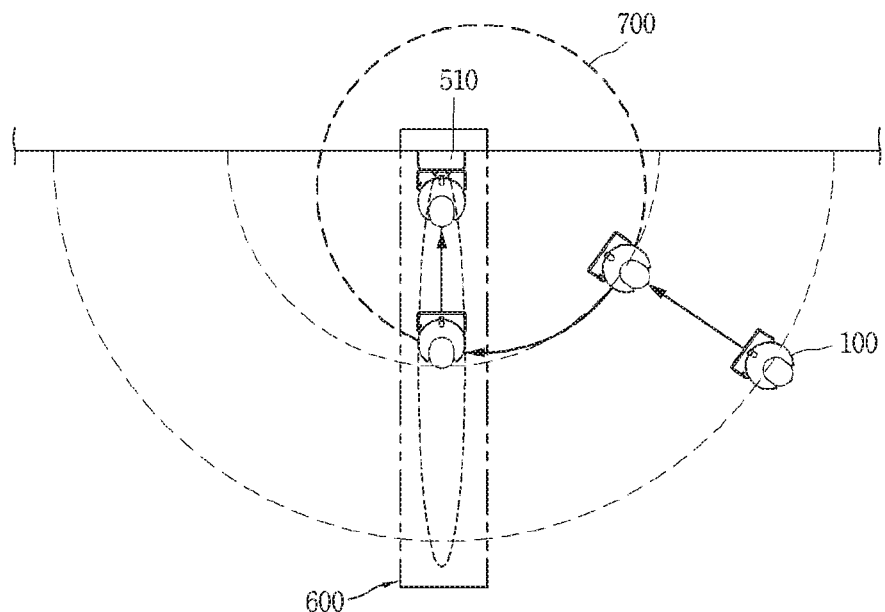
FIGS. 7A to 7C are conceptual views illustrating a method for a cleaner to dock to a charging station according to an embodiment of the present disclosure.

As illustrated in FIG. 7A, the overlap region 600 where all of the first to third signals emitted from the charging station 510 reach is located in front of the charging station 510. Thus, when the communication unit 1100 receives three or more kinds of signals from the charging station 510, the controller 1800 may determine that the main body of the cleaner 100 is located on the front side of the charging station 510. That is, when the communication unit 1100 receives three or more kinds of signals from the charging station 510, the controller 1800 may determine that the main body is located in the overlap region 600.

Accordingly, the controller 1800 may determine a kind of a signal that the communication unit 1100 receives from the charging station 510 at every predetermined period.

Meanwhile, the controller 1800 may determine a distance between the main body of the cleaner 100 and the charging station 510 using the signal received by the communication unit 1100 from the charging station 510.

In detail, the controller 1800 may determine a distance between the main body of the cleaner 100 and the charging station 510 by determining a kind of a signal received by the communication unit 1100 from the charging station 510.

For example, when the communication unit 1100 receives first to third long-ranged signals and does not receive the first to third short-ranged signals, the controller 1800 may determine that the main body is present outside of the concentrated emission region 601*b*, 602*b*, or 603*b* in the entire emission region 601*a*, 602*a*, or 603*a*.

Conversely, when the communication unit 1100 receives the first to third short-ranged signals, the controller 1800 may determine that the main body exists in the concentrated emission region 601*b*.

The controller 1800 may periodically determine a kind of a signal received by the communication unit 1100 and may determine whether the main body has entered the concentrated emission region 601*b*, 602*b*, or 603*b* as the kind of the signal is changed.

Figure 7B:
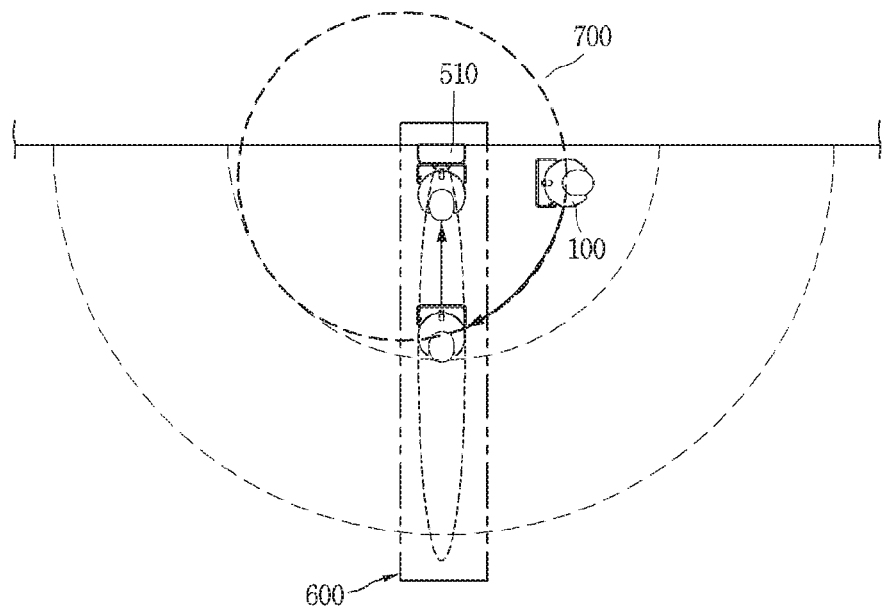

Referring to FIG. 7B, when the main body starts to move to dock to the charging station 510, if signals received from the charging station 510 are the first to third long-ranged signals, the controller 1800 may move the main body of the cleaner 100 to the position where the charging station 510 is installed.

That is, when the main body starts to move to dock to the charging station 510, if a distance between the charging station and the main body is equal to or greater than the reference distance, the controller 1800 may move the main body of the cleaner 100 to the position where the charging station 510 is installed.

Thereafter, the controller 1800 periodically determines a kind of a received signal, and at the time when the received signal is determined to include a short-ranged signal, the controller 1800 may control the driving unit 1300 to move the main body along a circle centered on a predetermined point.

That is, if it is determined that the distance between the charging station 510 and the main body of the cleaner 100 is less than the reference distance, the controller 1800 may control the driving unit 1300 to move the main body along a circle centered on a predetermined point.

Figure 7C:
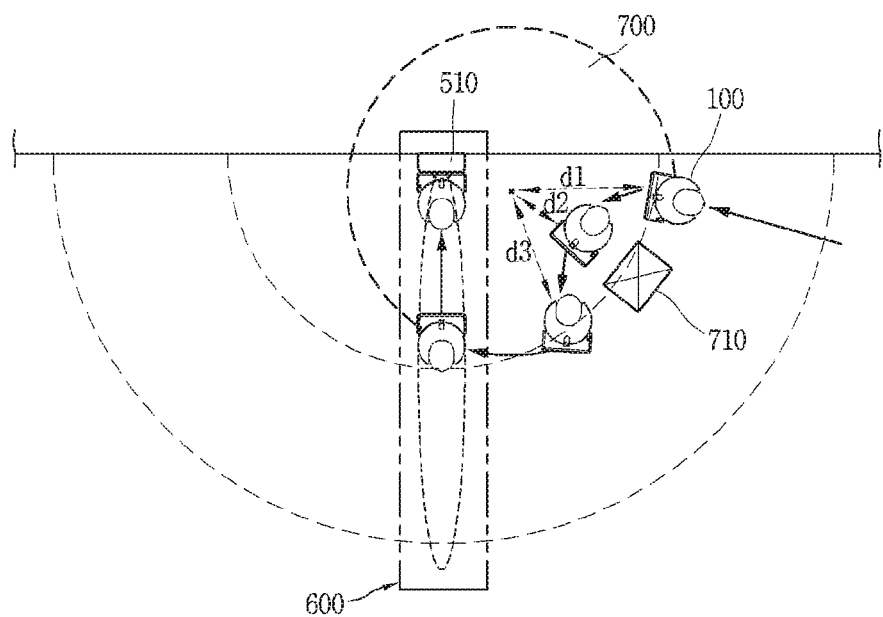

FIG. 7C illustrates an embodiment in which when the cleaner 100 detects an obstacle present on the traveling path corresponding to the circle, while moving along the circle for docking to the charging station 510, the cleaner travels to avoid the obstacle (i.e., avoidance traveling).

FIGS. 7A and 7B illustrate a method in which the cleaner 100 moves to the overlap region 600 according to positions at which the cleaner 100 starts to travel for docking. In contrast, FIG. 7C illustrates a method in which when the cleaner 100 meets an obstacle while moving to the overlap region 600 along the circular traveling path, the cleaner 100 avoids the obstacle and moves to the overlap region 600 stably.

First, the sensor unit 1400 of the cleaner 100 may sense information related to an obstacle present in the vicinity of the main body of the cleaner 100.

As illustrated in FIG. 7C, while the main body is moving along the traveling path corresponding to the circle, the controller 1800 may determine whether an obstacle is present on the traveling path using information sensed by the sensor unit 1400.

In detail, the sensor unit 1400 may sense information related to an obstacle present on the traveling path corresponding to the circle, using at least one of an ultrasonic sensor, an infrared sensor, and a camera sensor.

Referring to FIG. 7C, when it is determined that an obstacle 710 is present on the traveling path, the controller 1800 may control the driving unit 1300 such that the main body of the cleaner 100 is maintained at a predetermined distance from the obstacle 710.

While the obstacle 710 existing on the traveling path corresponding to the circle 700 is avoided the controller may detect distances d1, d2, and d3 between the center of a circle 700 and the main body.

When it is detected that the obstacle 710 is present on the traveling path corresponding to the circle 700, the controller 1800 may control the driving unit 1300 such that the main body of the cleaner 100 is maintained at a predetermined distance from the obstacle 710 and a distance between the center of the circle 700 and the main body is shorter than the radius of the circle 700.

After avoidance traveling with respect to the obstacle present on the traveling path corresponding to the circle 700, the controller 1800 may calculate a distance between the center of the circle and the main body at every predetermined period. When the distance between the center of the circle 700 and the main body corresponds to the radius of the circle, the controller 1800 may control the driving unit 1300 to move the main body along the traveling path corresponding to the circle.

Figure 8:
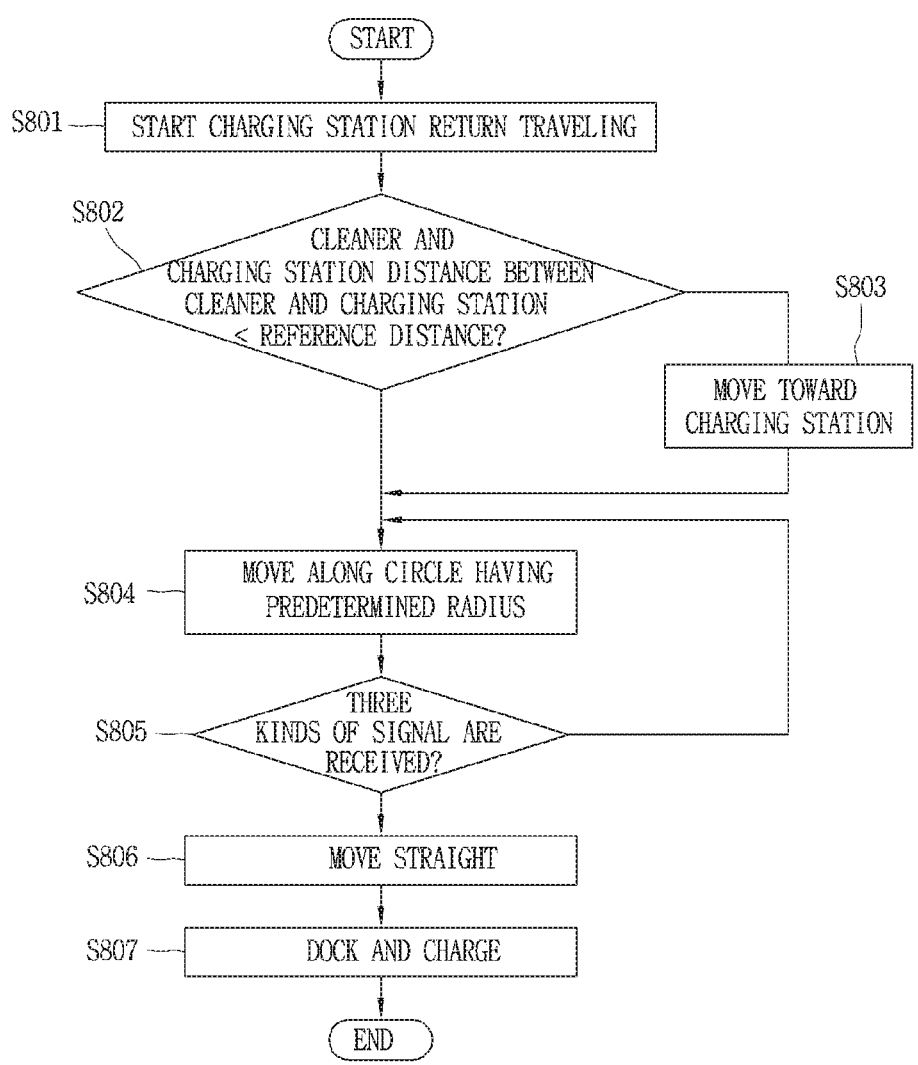
FIG. 8 is a flow chart illustrating a method for controlling a cleaner according to an embodiment of the present disclosure.

FIG. 8 illustrates a control method of the cleaner 100 according to the present invention.

When a remaining capacity of the battery drops below a limit capacity, the controller 1800 may control the driving unit 1300 to start charging station return traveling of the cleaner 100 (S801).

When the charging station return traveling starts, the controller 1800 may determine whether a distance between the main body of the cleaner 100 and the charging station 510 is less than a reference distance (S802).

Here, if the distance between the cleaner 100 and the charging station 510 is equal to or greater than the reference distance, the controller 1800 may move the main body of the cleaner 100 toward the charging station (S803).

If, however, the distance between the cleaner 100 and the charging station 510 is less than the reference distance, the controller 1800 may control the driving unit 1300 to move the main body of the cleaner 100 along a circle having a predetermined radius (S804).

While the main body of the cleaner 100 is moving along the circle, the controller 1800 may determine whether the communication unit 1100 of the cleaner 100 receives three kinds of signals from the charging station 510 (S805).

When it is determined that the communication unit 1100 receives three kinds of signals from the charging station 510, the controller 1800 may control the driving unit 1300 such that the main body of the cleaner 100 moves straight (S806).

In addition, the controller 1800 may dock the main body of the cleaner 100 to the charging station 510 and charge the battery (S807).

According to the present invention, a docking success rate of the cleaner performing autonomous traveling and the charging station may be enhanced.

Further, according to the present invention, it is possible to reduce a time required for the autonomous traveling cleaner to dock to the charging station. Thus, an amount of power that the cleaner according to the present invention requires to charge the battery may be minimized.

Therefore, the cleaner according to the present invention may reduce a limit capacity of the battery, which is a reference for starting the operation for charging the battery, so that the traveling performance of the cleaner may be improved.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An autonomous cleaner comprising:
   a main body;
   a motor that generates a force to move the main body;
   a battery that supplies power to the motor;
   a sensor that detects a signal emitted from a charging station to charge the battery; and
   a controller that manages the motor such that the main body moves to dock at the charging station based on the signal detected by the sensor,
   wherein the controller, when managing the motor, further
      determines whether the signal detected by the sensor includes a short-ranged signal that is detectable by sensor when the main body is positioned within a first prescribed distance of the charging station, and
      manages the motor such that the main body moves along a traveling path corresponding to an arc of a circle when the signal detected by the sensor includes the short-ranged signal, and
   wherein the controller is further configured to:
      detect different kinds of signals simultaneously detected by the sensor regardless of the signal source;
      count a number of kinds of the simultaneously sensed signals; and
      determine that the main body is located in front side of the charging station based on the number of kinds of the simultaneously sensed signals, wherein the controller determines that the main body is located in the front side of the charging station when there are three or more kinds of signals simultaneously sensed.

2. The autonomous cleaner of claim 1, wherein when the signal detected by the sensor does not include the short-ranged signal, the controller further:
   determines whether the signal detected by the sensor includes a long-ranged signal that is detectable by sensor when the main body is positioned within a second prescribed distance of the charging station that is greater than the first prescribed distance, and
   manages the motor such that the main body moves toward the charging station to search for the short-ranged signal when the signal detected by the sensor includes the long-ranged signal.

3. The autonomous cleaner of claim 2, wherein the controller further:
   determines whether the detected signal changes to include the short-ranged signal while the main body is moving toward the charging station, and
   manages the motor such that the main body moves along a traveling path corresponding to an arc of a circle when the detected signal changes to include a short-ranged signal.

4. The autonomous cleaner of claim 2, wherein the controller further manages the motor such that, before the main body starts moving toward the charging station to search for the short-ranged signal, the main body rotates until a side of the main body faces the charging station.

5. The autonomous cleaner of claim 4, wherein
   the circle is centered at a point spaced from the side of the main body by a particular distance in a direction toward the charging station.

6. The autonomous cleaner of claim 1, wherein
   the signal is a first signal,
   the autonomous cleaner further comprises a communication interface to receive a second signal from the charging station, and
   the controller determines a distance between the main body and the charging station based on the second signal received from the charging station.

7. The autonomous cleaner of claim 1, wherein
   the controller sets a radius of the circle based on one or more characteristics of a particular signal emitted from the charging station.

8. The autonomous cleaner of claim 7, wherein the one or more characteristics of the particular signal include at least one of a strength of the particular signal, a distance from the charging station that the particular signal is detectable by the sensor, or a kind of the particular signal.

9. The autonomous cleaner of claim 1, wherein
   the sensor further detects an obstacle, and
   the controller further determines whether the main body would contact the obstacle when moving on the traveling path corresponding to the arc of the circle.

10. The autonomous cleaner of claim 9, wherein when the main body would contact the obstacle when the main body is moving on the traveling path, the controller manages the motor such that the main body turns from the travelling path to be positioned at least a particular distance from the obstacle when travelling.

11. The autonomous cleaner of claim 10, wherein the controller further determines a distance between a center of the circle and the main body when the main body turns from the travelling path to be positioned at least the particular distance from the obstacle when travelling.

12. The autonomous cleaner of claim 11, wherein when the main body turns from the travelling path to be positioned at least the particular distance from the obstacle when travelling, the controller further manages the motor such that the predetermined distance from the obstacle and the distance between the center of the circle and the main body are less than a radius of the circle.

13. The autonomous cleaner of claim 11, wherein after traveling based on the main body turning from the travelling path to be positioned at least the particular distance from the obstacle, the controller manages the motor such that the main body moves along another traveling path corresponding to an arc of the circle when the distance between the center of the circle and the main body corresponds to the radius of the circle.

14. The autonomous cleaner of claim 1, wherein the controller determines a traveling direction of the main body on the traveling path based on a position where the circle is formed relative to the charging station.

15. The autonomous cleaner of claim 1, wherein
the three or more sources in the charging station include a first source that emits a first signal that is detectable by the sensor in a first region, and a second source that emits a second signal that is detectable by the sensor in a second region overlapping the first region, and
the controller manages the motor such that the main body turns from the traveling path and moves in the direction toward the charging station based on determining that the main body is in an overlap of the first and second regions when the sensor concurrently detects the first signal and the second signal.

16. The autonomous cleaner of claim 15, wherein
the first region is positioned to a left of overlap and the second region is positioned to a right of the overlap, and
the controller further manages the motor such that the main body moves counterclockwise along the arc of the circle when the detected signal is the first signal, and the main body moves clockwise along the arc of the circle when the detected signal is the first signal.

17. An autonomous cleaner comprising:
a main body;
a motor that generates a force to move the main body;
a battery that supplies power to the motor;
a sensor that detects a signal emitted from a charging station to charge the battery; and
a controller that:
  determines, based on the detected signal, when the main body is positioned within one of a first prescribed distance of the charging station or a second prescribed distance of the charging station, the second prescribed distance being greater than the first prescribed distance, and
  manages the motor such that the main body moves toward the charging station when the main body is positioned within the second prescribed distance and more than the first prescribed distance of the charging station,
wherein the controller is further configured to:
  detect different kinds of signals simultaneously detected by the sensor regardless of the signal source;
  count a number of kinds of the simultaneously sensed signals; and
  determine that the main body is located in front side of the charging station based on the number of kinds of the simultaneously sensed signals, wherein the controller determines that the main body is located in the front side of the charging station when there are three or more kinds of signals simultaneously sensed.

18. The autonomous cleaner of claim 15, wherein the three or more sources in the charging station include a third source that emits a third signal in a direction through an overlap of the first region and the second region.

19. An autonomous cleaner comprising:
a main body;
a motor that generates a force to move the main body;
a battery that supplies power to the motor;
a sensor that detects a signal emitted from a charging station to charge the battery; and
a controller that manages the motor such that the main body moves to dock at the charging station based on the signal detected by the sensor,
wherein the controller, when managing the motor, further determines whether the signal detected by the sensor includes a short-ranged signal that is detectable by sensor when the main body is positioned within a first prescribed distance of the charging station, and manages the motor such that the main body moves along a traveling path corresponding to an arc of a circle when the signal detected by the sensor includes the short-ranged signal
wherein:
  the sensor further detects an obstacle,
  the controller determines whether the main body would contact the obstacle when moving on the traveling path corresponding to the arc of the circle,
  when the main body would contact the obstacle when the main body is moving on the traveling path, the controller manages the motor such that the main body turns from the travelling path to be positioned at least a particular distance from the obstacle when travelling,
  the controller further determines a distance between a center of the circle and the main body when the main body turns from the travelling path to be positioned at least the particular distance from the obstacle when travelling, and
  after traveling based on the main body turning from the travelling path to be positioned at least the particular distance from the obstacle, the controller manages the motor such that the main body moves along another traveling path corresponding to an arc of the circle when the distance between the center of the circle and the main body corresponds to the radius of the circle.

* * * * *